(12) United States Patent
Choksi

(10) Patent No.: US 7,983,228 B1
(45) Date of Patent: Jul. 19, 2011

(54) INTEGRATION OF IP MULTIMEDIA SUBSYSTEM AND A PUSH-TO-TALK INTEROPERABILITY INFRASTRUCTURE

(75) Inventor: Ojas T. Choksi, Herndon, VA (US)

(73) Assignee: Nextel Communications Inc., Reston, VA (US)

( * ) Notice: Subject to any disclaimer, the term of this patent is extended or adjusted under 35 U.S.C. 154(b) by 1241 days.

(21) Appl. No.: 11/487,231

(22) Filed: Jul. 14, 2006

Related U.S. Application Data

(60) Provisional application No. 60/700,303, filed on Jul. 19, 2005, provisional application No. 60/698,920, filed on Jul. 14, 2005.

(51) Int. Cl.
*H04W 4/00* (2009.01)

(52) U.S. Cl. ...................................................... 370/338

(58) Field of Classification Search .................... 370/338
See application file for complete search history.

(56) References Cited

U.S. PATENT DOCUMENTS

| | | | |
|---|---|---|---|
| 6,912,389 B2 | 6/2005 | Bright et al. | |
| 6,915,142 B1 | 7/2005 | Wietfeld | |
| 7,170,863 B1 * | 1/2007 | Denman et al. | 370/260 |
| 2008/0043691 A1 * | 2/2008 | Chow et al. | 370/338 |

\* cited by examiner

*Primary Examiner* — Marivelisse Santiago-Cordero
*Assistant Examiner* — Omoniyi A Obayanju

(57) ABSTRACT

The present invention relates to converging a PTT Interoperability Infrastructure (PII) and an IP Multimedia Subsystem (IMS). In one embodiment, a common home subscriber server (HSS) and proxy call session control function (P-CSCF) are provided for both the PII and IMS. In another embodiment, a common registrar is used for both the PII and IMS. In still another embodiment, shared media element are provided for the PII and IMS. In yet another embodiment, session control element are shared between the PII and IMS.

10 Claims, 32 Drawing Sheets

INTEGRATION OF IP MULTIMEDIA SUBSYSTEM AND A PUSH-TO-TALK INTEROPERABILITY INFRASTRUCTURE

CROSS-REFERENCE TO RELATED APPLICATION

This application claims the benefit of U.S. Provisional Application No. 60/700,303, filed Jul. 19, 2005. This application also claims the benefit of U.S. Provisional Application No. 60/698,920, filed Jul. 14, 2005.

FIELD OF THE INVENTION

The present invention relates generally to the field of telecommunications, and in particular, to integrating IP Multimedia Subsystem (IMS) and a Push-To-Talk interoperability infrastructure (PII).

BACKGROUND OF THE INVENTION

Cellular communications systems typically provide interconnect and/or dispatch voice communication services. Interconnect voice communication services are those typically provided by most cellular carriers as circuit-switched communications. Dispatch communication services are commonly known as a walkie-talkie or PTT-type of call such as the service marketed by Sprint Nextel Corporation under the trade name Direct Connect. Interconnect voice communication services provided by most cellular carriers can be provided between sources and destinations of different cellular carriers. However, dispatch communication services are typically implemented in a proprietary manner which prevents dispatch calls from originating in one cellular carrier's network and terminating in another cellular carrier's network.

SUMMARY OF THE INVENTION

Disclosed and claimed herein are systems for integration of IP Multimedia Subsystem (IMS) and a Push-To-Talk interoperability infrastructure (PII). In one embodiment, a system for converging a PII and an IMS includes a home subscriber server (HSS) configured to be shared by the PII and the IMS, and a common edge proxy for the PII and IMS. The system further includes a PII registrar, an IMS registrar, a PII session control element, an IMS session control element, a PII media element and an IMS media element.

Other objects, advantages and novel features of the present invention will become apparent from the following detailed description of the invention when considered in conjunction with the accompanying drawings.

BRIEF DESCRIPTION OF THE DRAWING FIGURES

Figure 23:
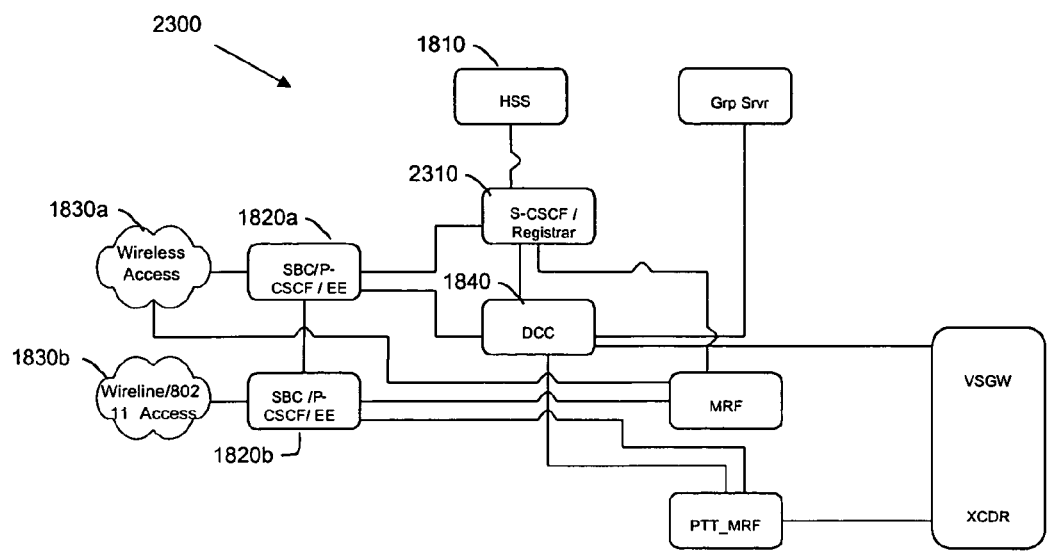
FIG. 23 illustrates an architecture for converging PII with IMS in accordance with a second embodiment of the invention.
Figure 24:
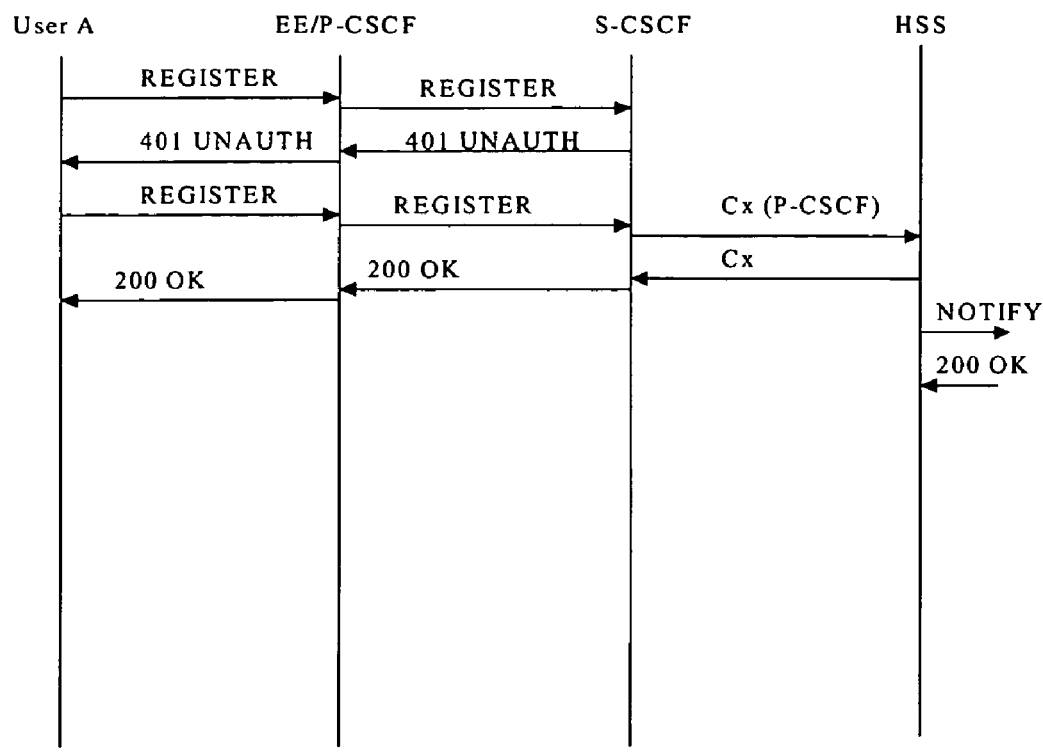
Figure 25:
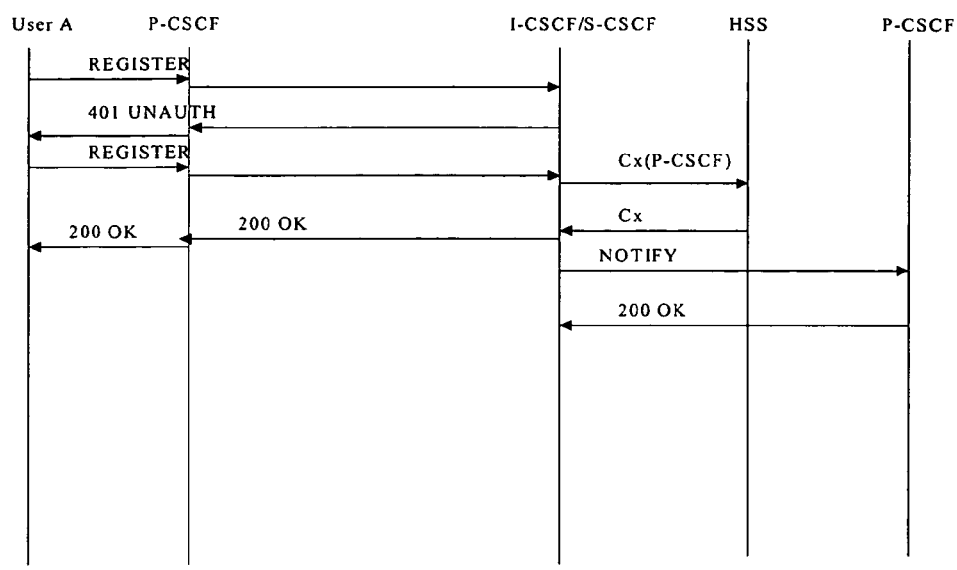
Figure 26:
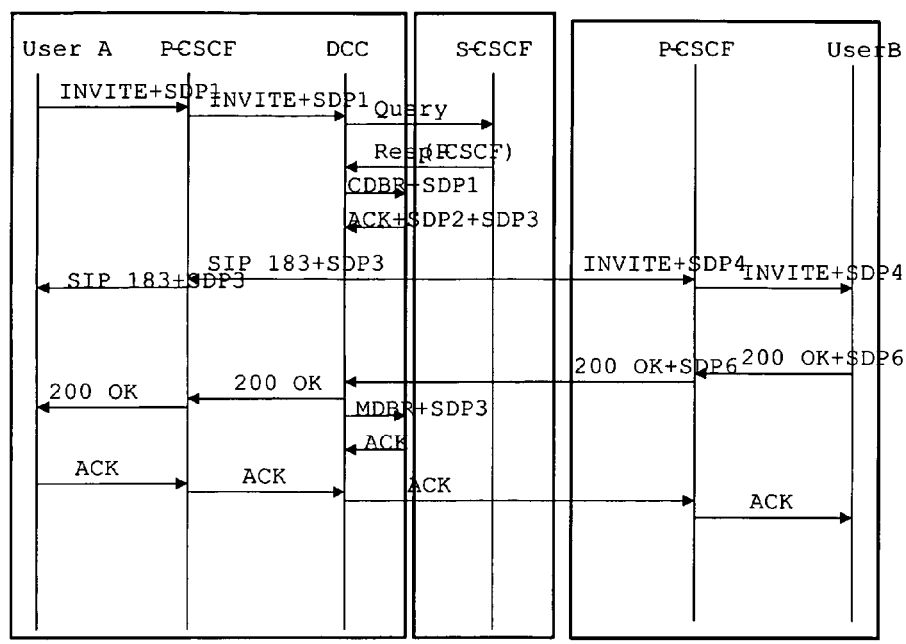
Figure 27:
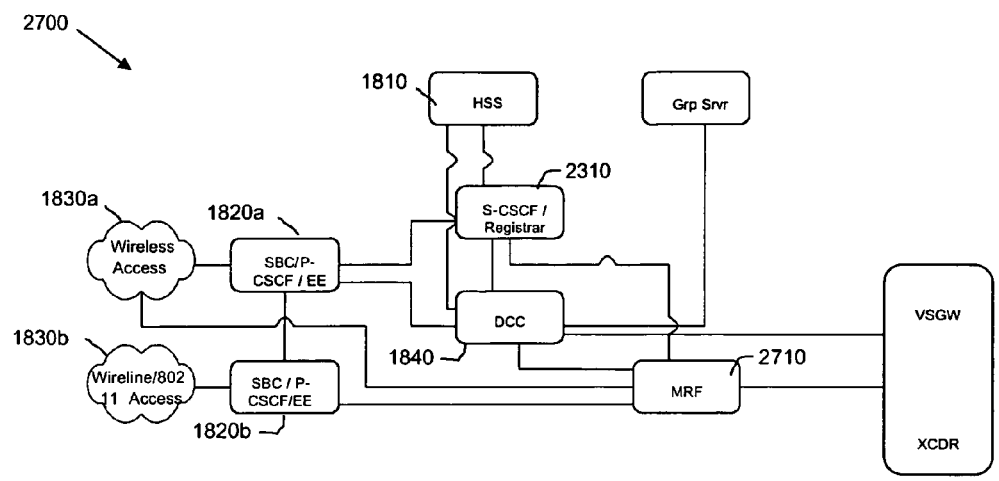
Figure 28:
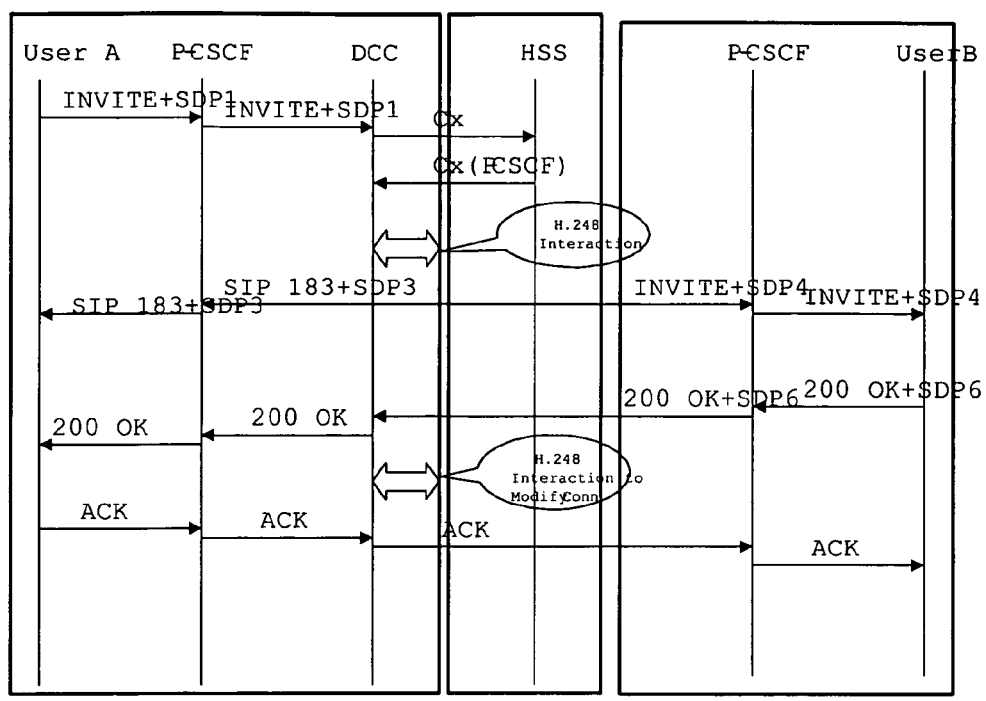
Figure 29:
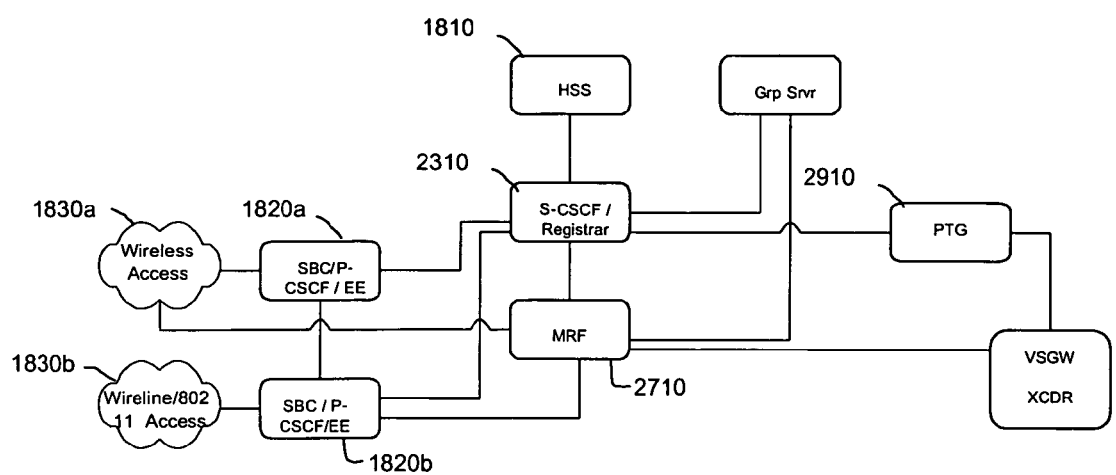
Figure 30:
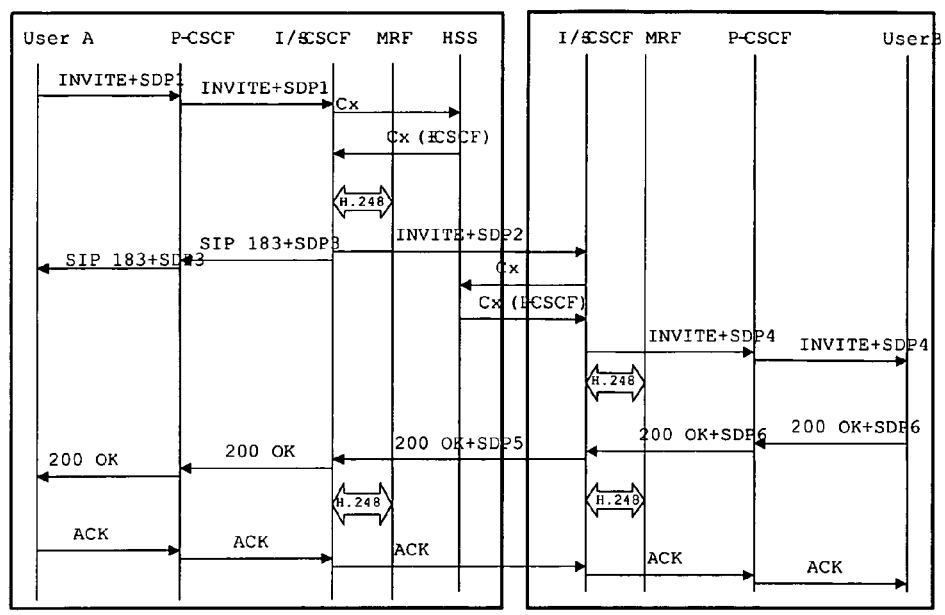
Figure 31:
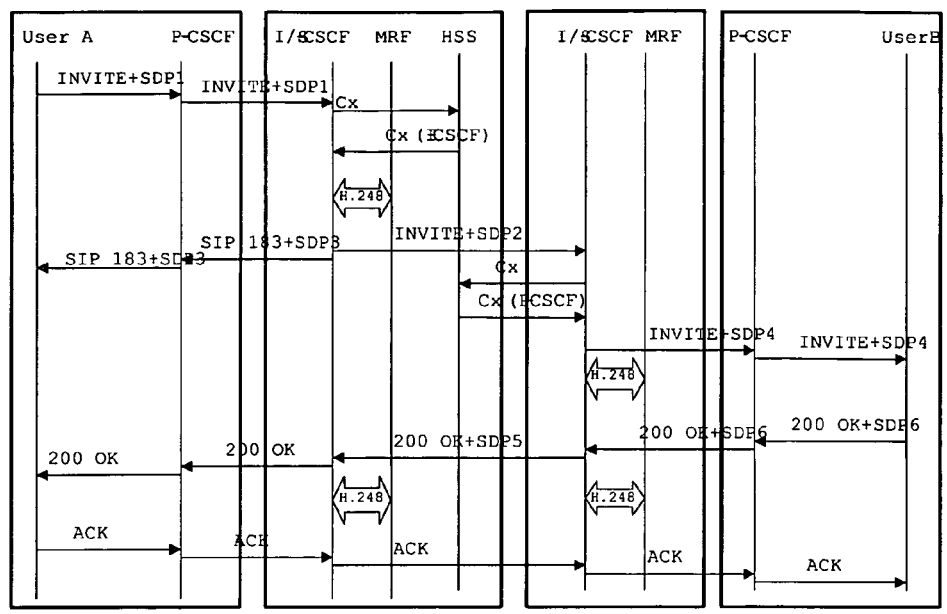
Figure 32:
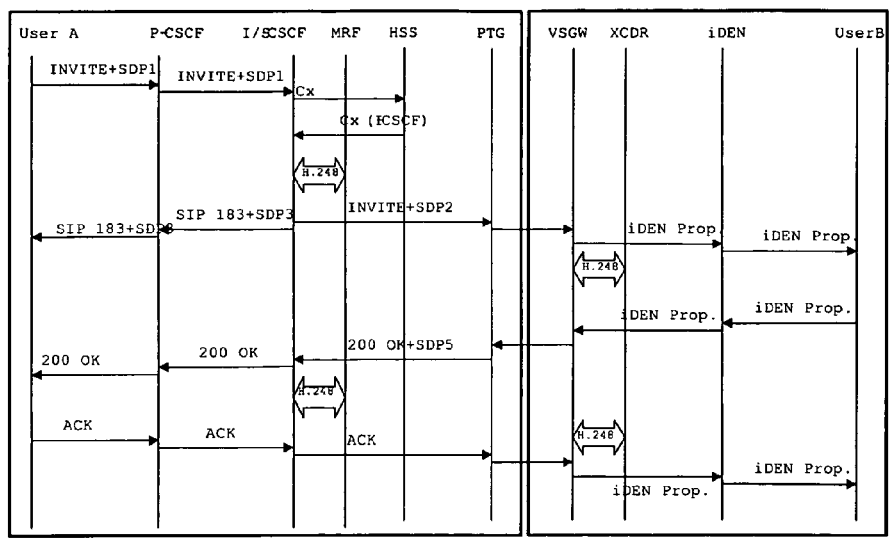

FIG. 24: illustrates an exemplary call flow for the converged architecture of FIG. 23 for home dispatch registration;

FIG. 25 illustrates an exemplary call flow for the converged architecture of FIG. 23 for visitor dispatch registration;

FIG. 26 illustrates an exemplary call flow for PTT call setup in accordance for the converged architecture of FIG. 23;

FIG. 27 illustrates an architecture for converging PII with IMS in accordance with a third embodiment of the invention;

FIG. 28 illustrates an exemplary call flow for PTT call setup for the converged architecture of FIG. 27;

FIG. 29 illustrates an architecture for converging PII with IMS in accordance with a fourth embodiment of the invention;

FIG. 30 illustrates an exemplary call flow for converged architecture of FIG. 29, wherein both the calling party and called party are in home areas;

FIG. 31 exemplary call flow for the converged architecture of FIG. 29, wherein both the calling party and called party are in visited areas; and FIG. 32 exemplary call flow for the converged architecture of FIG. 29—SIP to iDEN PTT session setup.

DETAILED DESCRIPTION OF THE PREFERRED EMBODIMENTS

The present disclosure provides four different options for converging a PII and an IMS. In a first option, a common home subscriber server (HSS) and a common proxy call session control function (P-CSCF) are provided for both the PII and IMS, while separate registrars, session control elements and media elements are maintained. In accordance with a second option, a common registrar is also provided for both the PII and IMS, while separate session control elements and media elements are maintained. In accordance with a third option, a shared media element is provided for the PII and IMS, while separate session control elements are maintained. In accordance with a fourth option, the PII and IMS are fully integrated by further providing a shared session control element For convenience, a list of some acronyms associated with the IMS and PII architecture are provided below:

| | |
|---|---|
| API | Application Program Interface |
| BG | Border Gateway |
| BGCF | Breakout Gateway Control Function |
| BS | Bearer Service |
| COPS | Common Open Policy Service |
| CS | Circuit Switched |
| CSCF | Call Session Control Function |
| DCC | Dispatch Call Controller |
| DNS | Domain Name System |
| ETSI | European Telecommunications Standards Institute |
| GGSN | Gateway GPRS Support Node |
| HSS | Home Subscriber Server |
| I-CSCF | Interrogating-CSCF |
| iDEN | Integrated Digital Enhanced Network |
| iGW | iDEN Gateway |
| IMS | IP Multimedia Subsystem |
| IP | Internet Protocol |
| ISDN | Integrated Services Digital Network |
| ISP | Internet Service Provider |
| MEGACO | Media Gateway Controller Protocol |
| MGCF | Media Gateway Control Function |
| MGF | Media Gateway Function |
| MRFC | Media Resource Function Controller |
| MRFP | Media Resource Function Processor |
| NAI | Network Access Identifier |
| NAT | Network Address Translation |
| OSA | Open Services Architecture |
| P-CSCF | Proxy-CSCF |
| PDP | Policy Definition Point |
| PEP | Policy Enforcement Points |
| PSTN | Public Switched Telephone Network |
| PII | PTT Interoperability Infrastructure |
| PTT | Push-To-Talk |
| QoS | Quality of Service |
| RFC | Request for Comments |
| RTP | Real-time Transport Protocol |
| SBC | Session Border Control |
| SCIM | Smart Common Input Method platform |
| SCS | Service Capability Server |
| S-CSCF | Serving-CSCF |
| SDP | Session Description Protocol |
| SGSN | Serving GPRS Support Node |
| SIP | Session Initiation Protocol |
| TLS | Transport Layer Security |
| UDP | User Datagram Protocol |
| UE | User Equipment |
| UFMI | Urban Fleet Member Identifier |
| UMTS | Universal Mobile Telecommunications System |
| URI | Uniform Resource Identifier |

Functional Comparison

Figure 1:
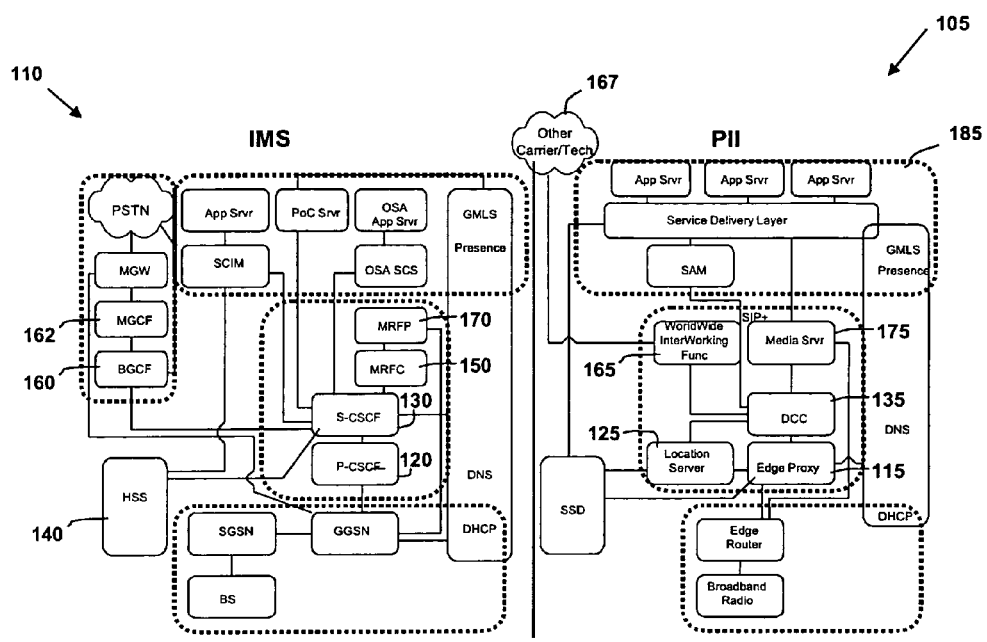
FIG. 1 illustrates a comparison between the IMS and PII architectures.

FIG. 1 compares the functional entities of PTT Interoperability Infrastructure (PII) 105 with that of the IMS reference architecture 110. Although beyond the scope of this disclosure, a detailed functional description of the physical elements of the IMS reference architecture 100 is available in ETSI TS 123 228 V5.4.1 (2002-04) UMTS; IP Multimedia Subsystem (IMS); Stage 2 (3GPP TS 23.228 version 5.4.1 Release 5), the entire disclosure of which is herein expressly incorporated by reference. The PII 105 is described in detail in co-pending U.S. Provisional Patent Application No. 60/698,920, filed Jul. 14, 2005, and to which this application claims priority.

In the embodiment of FIG. 1, both architectures use SIP as the basis for registration and session control. A hierarchy of SIP servers enables the service, while DNS servers assist user devices in service discovery. Both architectures 105 and 110 are modular and extensible, and integrate into the services layer via APIs.

Continuing to refer to FIG. 1, the PII 105 uses edge proxy 115 to authenticate subscribers by interacting with AAA/UserDB. The edge proxy 115 is also used to maintain persistent connection to route incoming calls to users, route incoming messages to appropriate servers, assist in NAT traversal, and maintain security association between itself and the UE.

Similarly, the IMS 110 uses a combination of the SBC (not shown), the P-CSCF 120 and the I-CSCF (not shown) to match the functionality of the edge proxy 115. In particular, the SBC maintains persistent connection to route incoming calls to users, and assists in NAT traversal. Meanwhile, the P-CSCF is charged with, among other things, routing SIP messages to and from the UE and the I-CSCF, maintaining security association between itself and the UE. The I-CSCF assigns a S-CSCF to a particular UE, routes requests from other networks to S-CSCF, interacts with HSS for routing registration and interoperates with other carriers.

Figure 3:
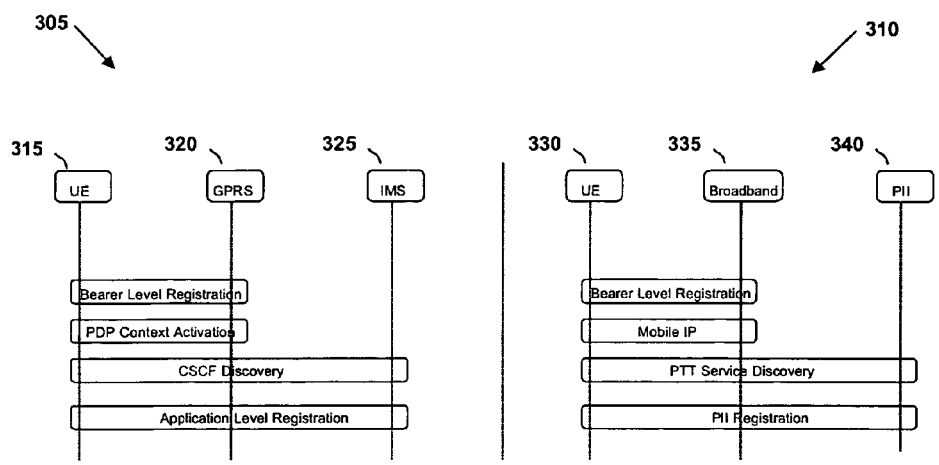
FIG. 3 illustrates exemplary hierarchy of registrations in IMS and PII.

Continuing to refer to FIG. 3, the Location Server 125 and the DCC 135 of the PII 105 perform the corresponding functions of the HSS 140 and S-CSCF 130 of the IMS 110. In particular, the Location Server 125 maintains location and address of connected users, and notifies the DCC 135 about the location of registered users. The DCC 135 originates and completes sessions and performs arbitration of dispatch sessions, interacts with media server to allocate media resources, interacts with the iGW for iDEN domain calls, and may even serve as a proxy for application servers.

Similarly, the S-CSCF 130 alone authenticates subscribers by interacting with HSS 140, forwards registration messages to application servers and notifies P-CSCF 120 of user mobility, originates and completes sessions and performs feature interaction in mid-call, interacts with MRFC 150 to get media resources allocated, interacts with BGCF 160 for PSTN/CS domain calls, and behaves as a proxy for application servers. HSS 140 maintains the location of the registered users and notifies requesting servers of successful registration and de-registration.

As also shown in FIG. 1, the World-Wide Interworking Function 165 of the PII 105 provides interworking access across dispatch technologies and other carriers (e.g., other carrier/technology 167). Details of the World-Wide Interworking Function 165 are set forth in U.S. patent application Ser. No. 11/047,892, entitled "Architecture to Facilitate Interoperability and Inter-Working of Push to talk technologies," filed Feb. 1, 2005, which is hereby fully incorporated by reference. On the IMS 110 side, such functionality is provided by the BGCF 160 and MGCF 162.

The Media Server 175 of the PII 105 assists in NAT traversal, and management of jitter in the media streams. This functionality is provided in the IMS 110 infrastructure by the MRFC 150 and MRFP 170, as shown in FIG. 1.

Finally, AAA server 185 is the data-store for subscriber's dispatch data for the PII 105 architecture, while the HSS 140 is the data-store for subscriber data for the IMS 110 architecture.

Addressing

Figure 2:
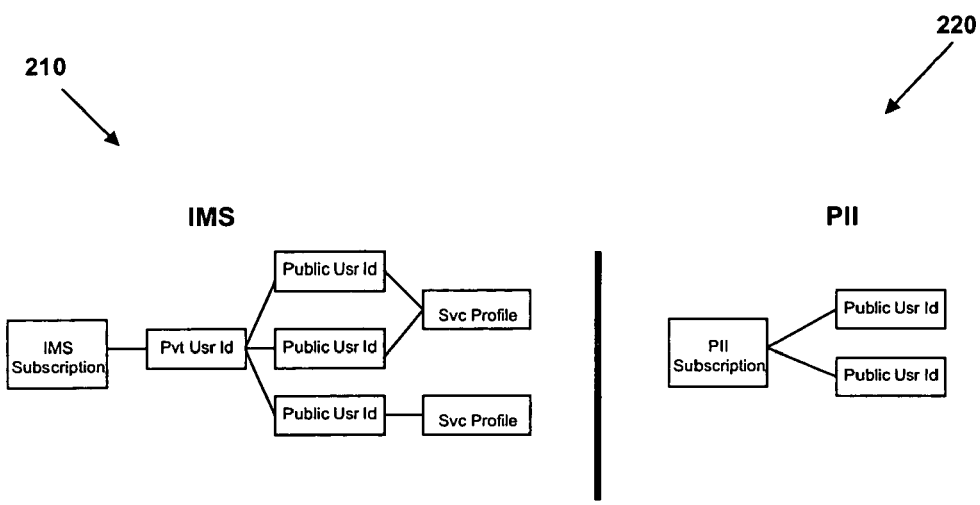
FIG. 2 illustrates exemplary user addressing.

FIG. 2 illustrates the addressing scheme for user identities and their association with a subscription for both IMS and PII. In particular, IMS addressing 210 involves a private user identity that is uses an NAI format, identifies the IMS subscription, and is globally unique. IMS addressing 210 also includes a public user identity and the ability to provide multiple registrations via a single request (i.e., registration of service profile).

In the case of PII addressing 220, the user identity also has an NAI format and is globally unique, but is bound by the necessity to be interoperable with UFMI addressing prevalent in the current iDEN network. Both PII addressing 220 and IMS addressing 210 use the SIP URI format for routing sessions between the system elements.

Registration

FIG. 3 provides a high level comparison of the levels of registrations within IMS and PII, both of which are done via SIP. In the case of PII registration 305, the user is authenticated by the edge element (e.g., edge proxy 115) via the AAA server 185. In contrast, IMS registration 310 uses the S-CSCF 130 to authenticate subscriber via HSS 140.

As shown in FIG. 3, IMS registration between UE 315 and IMS 325 over GPRS 320 connection involves bearer-level registration, PDP context activation, CSCF discovery, and application-level registration. PII registration 310 involves bearer-level registration, mobile IP, PTT service discovery, and PII registration.

Both IMS and PII use the SIP protocol for registration. However, PII registration 305 uses RADIUS to interface to the AAA server, while IMS registration 310 uses Cx (DIAMETER based) to interface to the HSS 140. Also, in PII registration 305 the final registration is passed to the Location Server 125, which serves as the repository of active dispatch registrations. The location server is responsible for notifying the previous edge elements of user mobility. In IMS registration 310, S-CSCF 130 notifies the previous P-CSCF 120 of user mobility by sending a SIP notification. Moreover, both HSS 140 and S-CSCF 130 can notify an application server of user registration. S-CSCF 130 forwards a SIP REGISTER message, while HSS 140 uses DIAMETER application.

Figure 4:
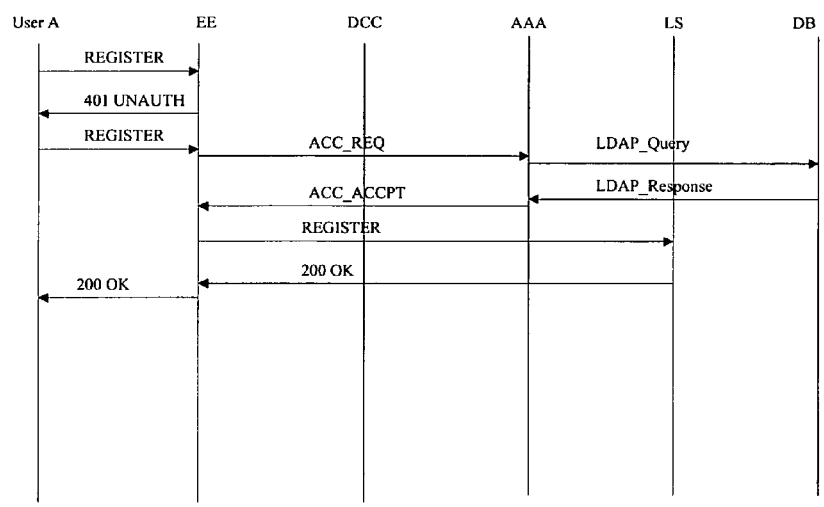
FIG. 4 illustrates an exemplary call flow for PII registration in a home area.
Figure 5:
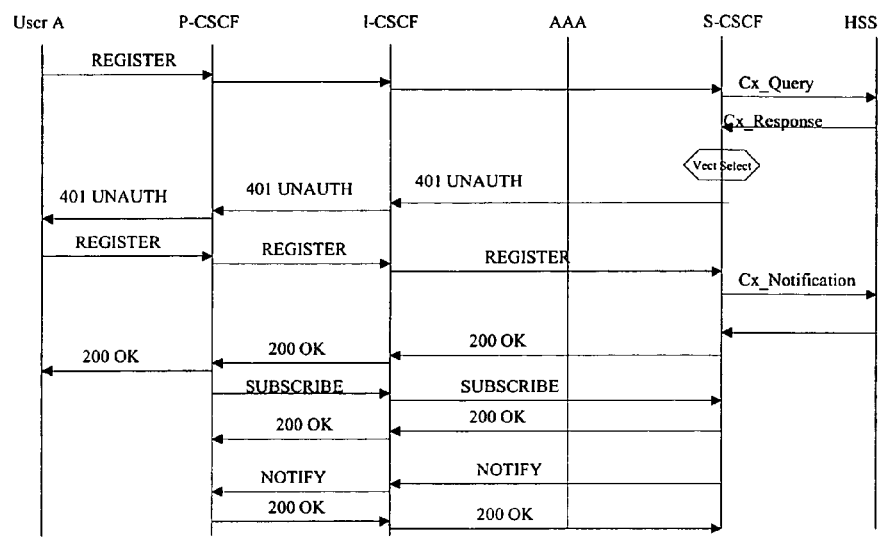
FIG. 5 illustrates an exemplary call flow for IMS registration in a home area.
Figure 6:
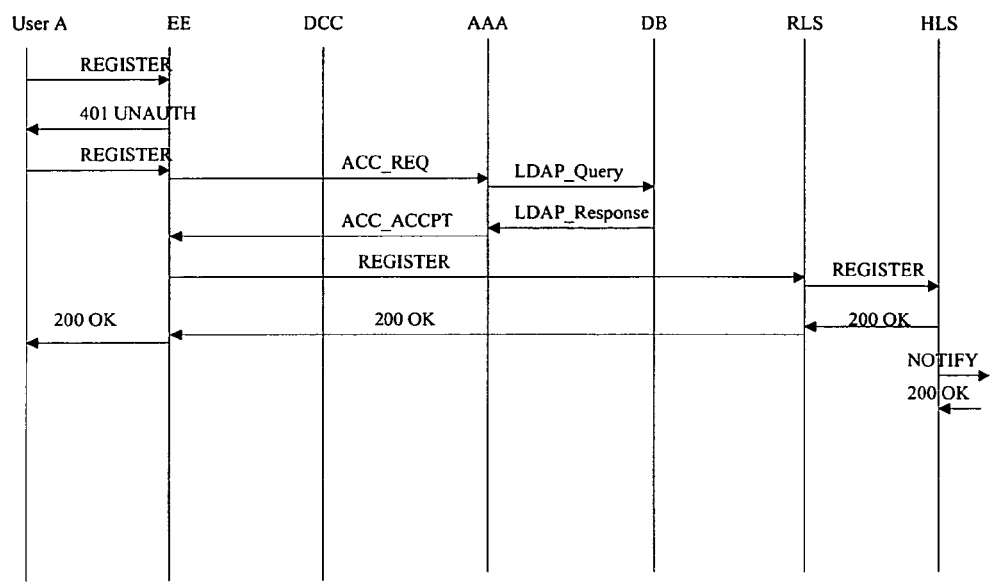
FIG. 6 illustrates an exemplary call flow for PII registration in a visited area.
Figure 7:
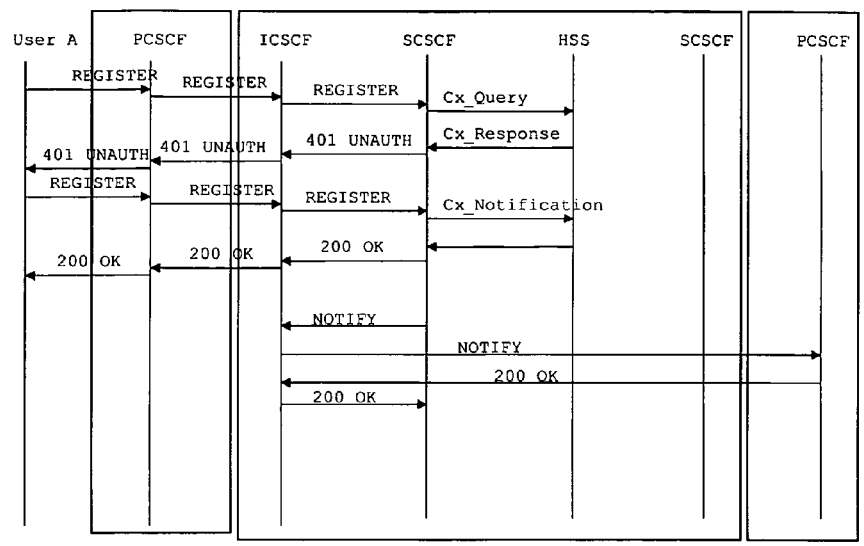
FIG. 7 illustrates an exemplary call flow for IMS registration in a visited area.

Referring now to FIG. 4, depicted is one embodiment of the message flow for the registration process within the home network for PII, while FIG. 5 depicts one embodiment of the message flow for the registration process within the home network for IMS. Similarly, one embodiment of the message flow for the registration process in a visiting network for PII is depicted in FIG. 6, while an embodiment of the registration process in a visiting network for IMS is shown in FIG. 7.

In short, the PII performs authentication at the edge proxy 115 with registration being done with the Location Server 125, which provides the address of the edge element 115 to which the user is addressed to the DCC 135. The user is associated with the edge element 115, and the previous roaming location server is notified of mobility by the home location server. In contrast, IMS performs authentication and registration at the S-CSCF 130. The S-CSCF 130 notifies the P-CSCF 120 of user mobility, and a user is associated with a given S-CSCF 130.

Services Architecture

Figure 8:
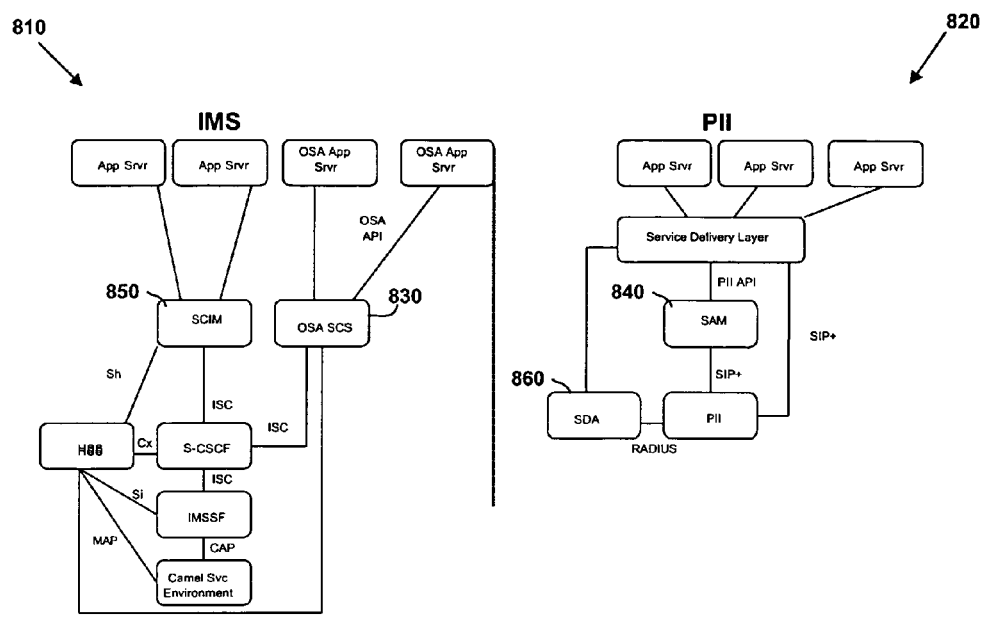
FIG. 8 illustrates an exemplary services architecture for IMS and PII.

Referring now to FIG. 8, illustrated is the IMS services architecture 810 and PII services architecture 820 to open up the infrastructure to third party application developers. As shown, the Open Services Architecture Service Capability Server (OSA SCS) 830 and SAM 840 are similar in that they can both abstract IMS interfaces/protocols into easy to implement APIs (e.g., PII API and OSI API) that can be used by application developers to develop differentiating applications. Moreover, both architectures also have the ability to provide native protocol to the application servers. In the IMS architecture 810 this is done via SCIM 850, while in the PII architecture 820 this is done via the Service Delivery Architecture (SDA). Finally, the mediation component of the SDA 860 may be equivalent to SCIM 850.

Figure 9:
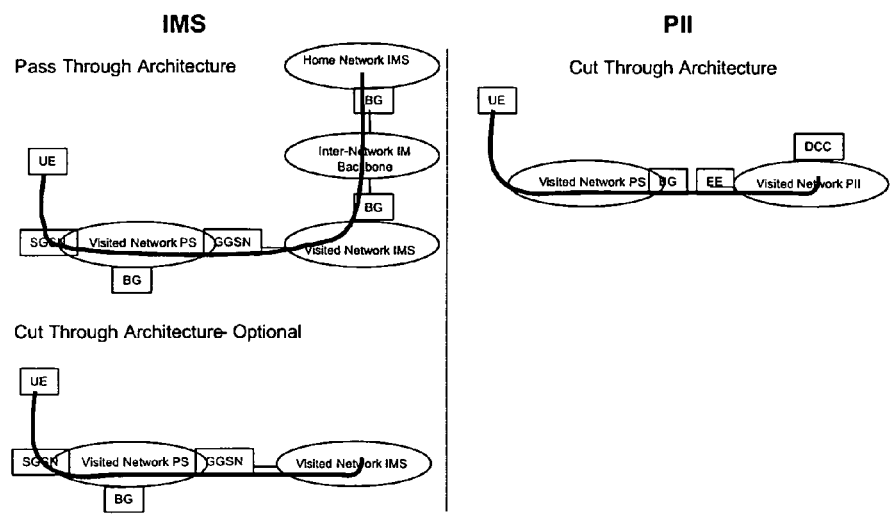
FIG. 9 illustrates service and session hosting.

As shown in FIG. 9, in IMS architecture the subscribed services are hosted and controlled from the home network of the subscriber, irrespective of the location of the subscriber. In contrast, in the PII architecture the local infrastructure provides the service.

The cut through architecture provides a better latency performance than the pass through architecture. However, this architecture may require that that all regions be identical in their enhanced service offering, otherwise the end-user experience may be affected due to inconsistencies in the enhanced services supported by visited and home networks. Given the architecture requirements of interoperability across carriers and countries, pass through architecture may be preferable for maintaining a consistent user experience for roaming subscribers.

Session Call Flows

Figure 10:
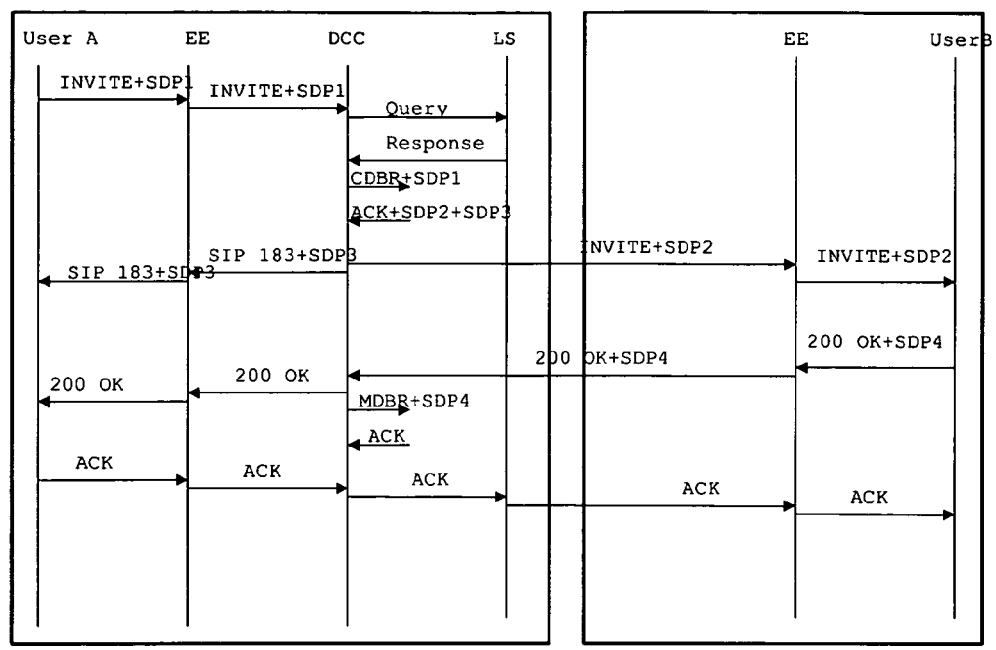
FIG. 10 illustrates an exemplary call flow for PII session setup when both the calling party and called party are in their home areas.
Figure 11:
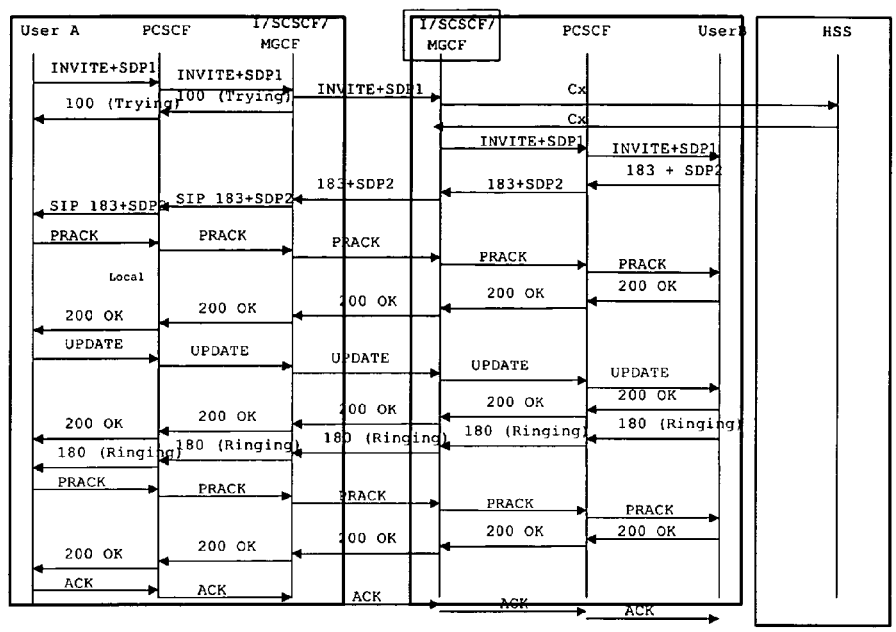
FIG. 11 illustrates an exemplary call flow for IMS session setup when both the calling party and called party are in their home areas.

FIG. 10 depicts the intra-region sessions for PII, while FIG. 11 depicts the intra-region session call flows for IMS. It should be appreciated that one difference between the sessions of PII and IMS is the media allocation. In particular, IMS does not require media entity during one-to-one (i.e., private) sessions. Rather, it relies on the underlying transport to route the media traffic between the peer users. The media resources are only allocated when conferencing is required.

On the other hand, PII infrastructure ensures that media resources are allocated for every dispatch session. The media server may be used to ensure traversal of NAT devices that might be present in the path between the user device and the system. It may also smooth out the jitter in the incoming media stream before forwarding it the destination user. It may also perform floor arbitration between participants, a key enabler of dispatch session. Alternatively, floor arbitration can be done in DCC 135 via SIP messaging.

Figure 12:
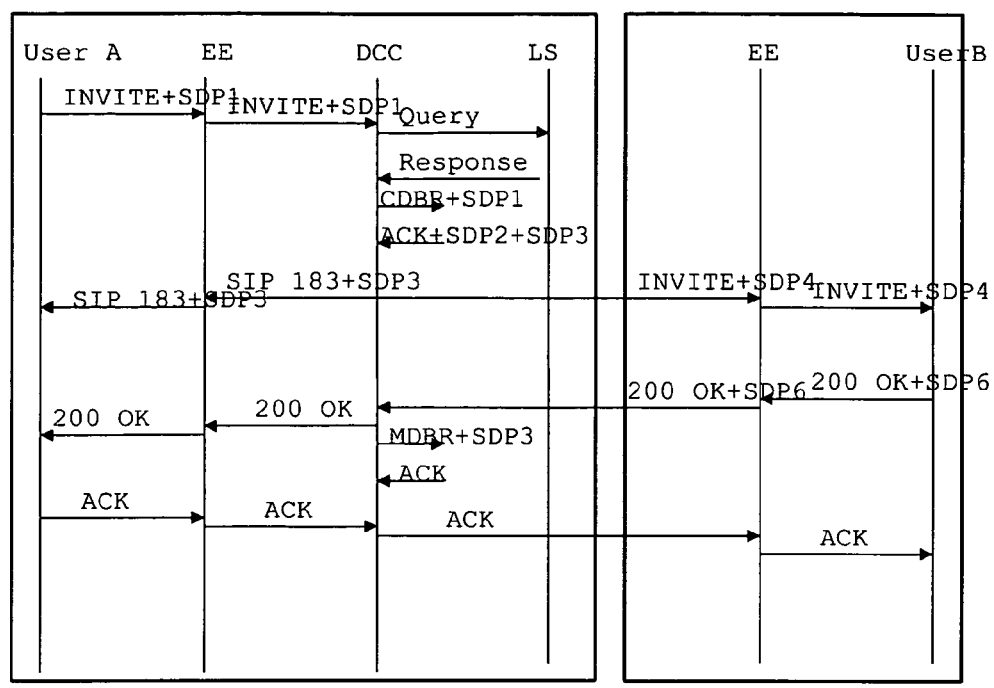
FIG. 12 illustrates an exemplary call flow for PII session setup when the calling party is in a home area and the called party is in a visited area.
Figure 13:
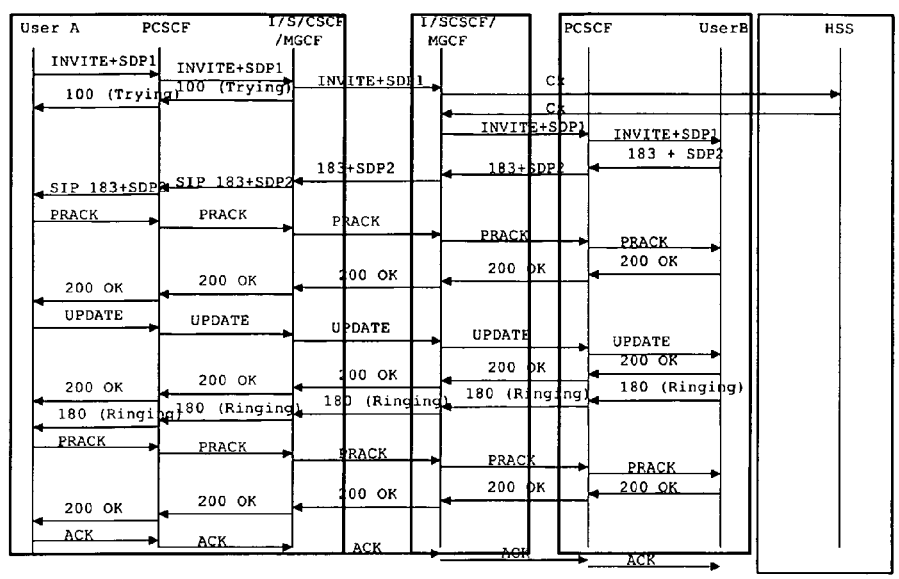
FIG. 13 illustrates an exemplary call flow for IMS session setup when the calling party is in a home area and the called party is in a visited area.

FIG. 12 illustrate the inter-region session call flows for PII when the called party is roaming. In one embodiment, the same session call flows would take place when the calling party is roaming as well. FIG. 13, on the other hand, depicts the inter-region session call flows for IMS for the same situations. Comparing the session call flows of FIGS. 12 and 13, it should be noted that there are two noteworthy differences. First, the IMS call flows of FIG. 13 use two S-CSCF—an originating S-CSCF and a terminating S-CSCF. This enables the originating S-CSCF and terminating S-CSCF to mediate enhanced features during a session. In contrast, the PII call flows of FIG. 12 use the originating DCC to also serve as the terminating DCC. The originating DCC may query the location of the called user and forward the invite to the edge element to which the user is attached.

The second noteworthy difference between FIGS. 12 and 13 is that, in the case of IMS session calls, the S-CSCF for a roaming subscriber does not change. The call is always routed to the home serving CSCF assigned to the registered subscriber even if the user is roaming outside its home region. In the case of PII, the local DCCs host call originations from roaming subscribers.

Figure 14:
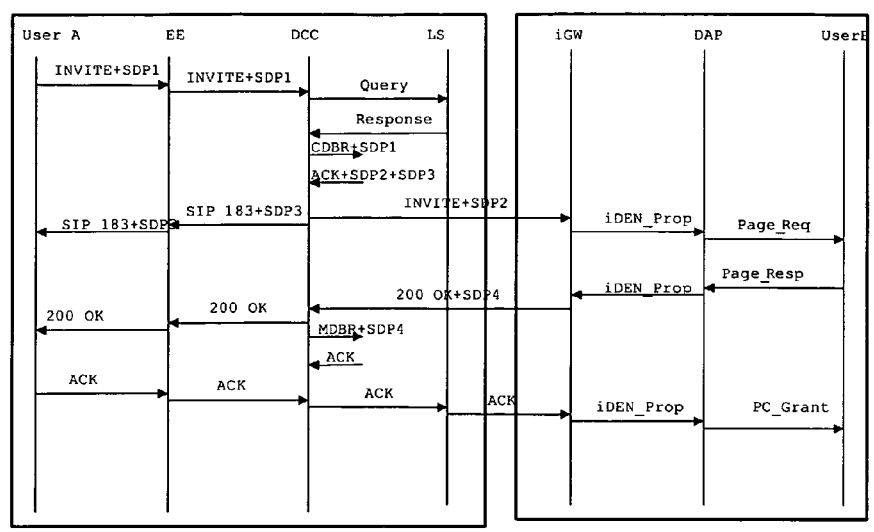
FIG. 14 illustrates an exemplary call flow for PII-SIP to iDEN session setup.
Figure 15:
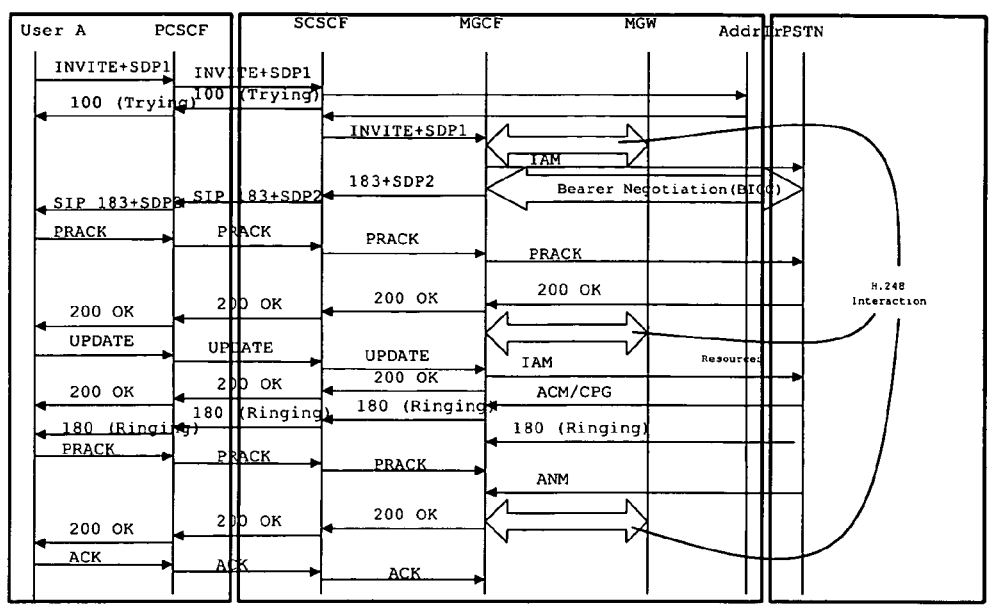
FIG. 15 illustrates an exemplary call flow for IMS-PSTN session setup.
Figure 16:
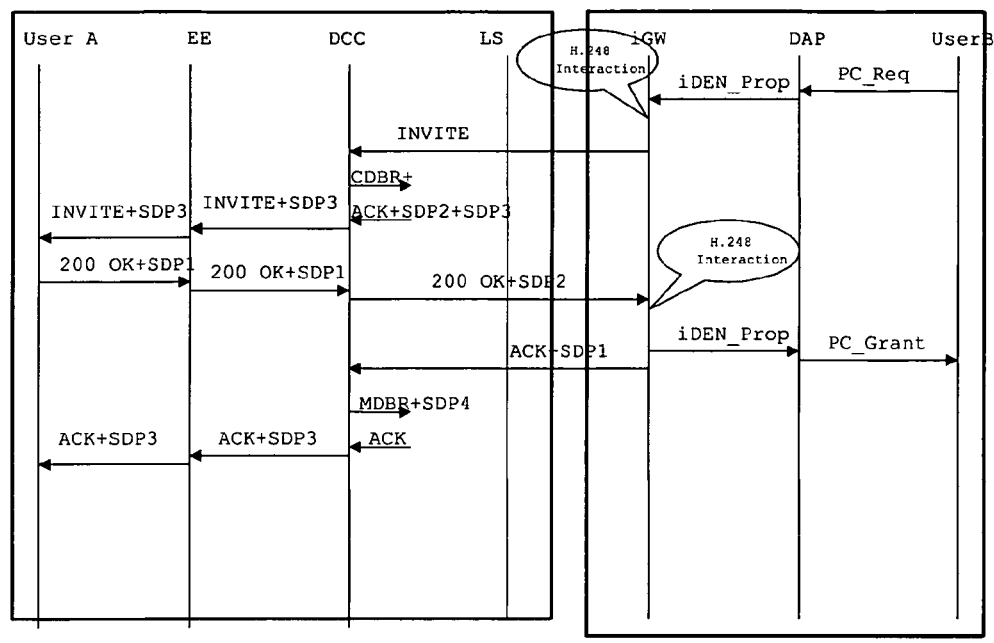
FIG. 16 illustrates an exemplary call flow for iDEN-SIP session setup.

Referring now to FIGS. 14-17, depicted are session setup call flows for PII and IMS. In particular, FIG. 14, illustrates a call flow for PII using SIP-to-iDEN session setup. FIG. 15 illustrates a call flow for IMS using PSTN session setup. FIG.

Figure 17:
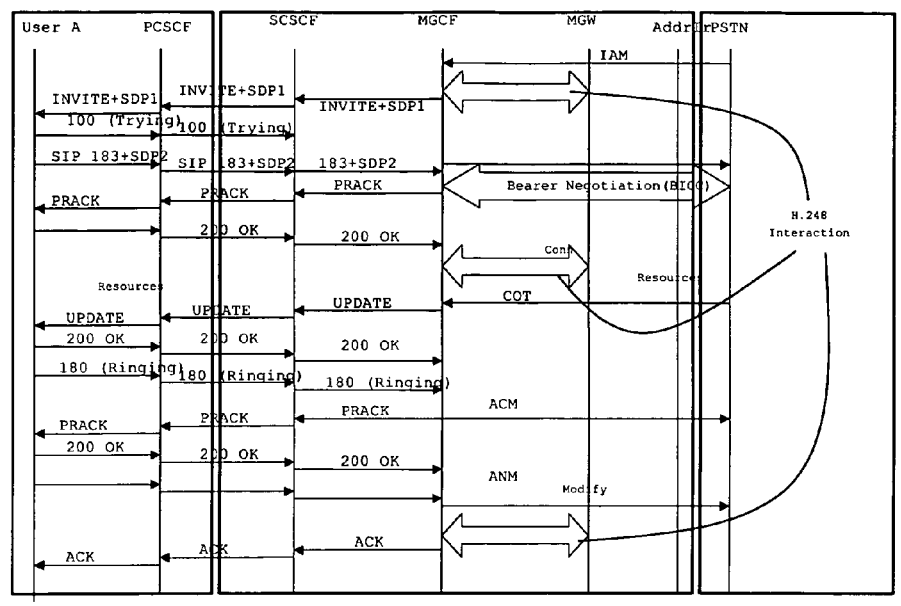
FIG. 17 illustrates an exemplary call flow for PSTN-SIP session setup.

16 then illustrates a call flow for iDEN using SIP session setup, and FIG. 17 illustrates the call flow for PSTN using SIP session setup.

To summarize, in the PII architecture, intra-regional session setups utilize a media server, even for one-to-one sessions to facilitate NAT traversal and to facilitate enhanced features like member addition in mid-call. Moreover, only one session controller is involved in the session. In the IMS architecture, intra-regional session setups use a media server for conferencing only, and it is possible that two S-CSCFs may be involved in the session.

With respect to inter-regional session setups, PII uses one session controller, the local session controller, which provides the service to the requesting subscriber irrespective of its roaming status. In addition, a media server is used, and no mechanism exists to hide the network topology. Moreover, for visiting subscribers a cut-through mechanism may be employed to improve the call setup and media latency performance.

In contrast, the inter-regional session setups for IMS involves the use of two S-CSCFs. Unlike in the PII context, no media resources are allocated for one-to-one sessions, and the I-CSCF has the ability to hide the topology is involved in inter-regional sessions. For visiting subscribers, the pass-through mechanism is employed to provide a consistent user experience to the subscriber.

Client-Server Interface Differences

Both the IMS and PII architectures use SIP for at least their client-to-server interface for session control. However, both have enhanced SIP to suit their specific needs. For example, in the case of IMS, a P-Associated-URI is used to transfer all identities that a user can claim. It is introduced in 200 OK by the registrar function of the S-CSCF. P-Called-Party-ID is used to communicate the intended address-of-record that may have changed in the Request-URI of the original request. It is possible that the proxy may target the request to the contact address provided by the calling party. The P-CSCF may insert this field into a header field, such as the INVITE header.

IMS also uses P-Visited-Network-ID. This field is used by the visited network to provide its ID to the home network. This may be required, for example, to verify the roaming arrangements between the home and visited network. The P-CSCF may insert this into the header at the time of registration. It may include in the header of INVITE, SUBSCRIBE and REFER.

IMS also uses P-Access-Network-Info to provide information about the type of access network to the home network. The user client inserts this into the header of SIP request/response directed to the home network.

The P-Charging-Function-Addresses may be used by the IMS architecture to provide the address of the charging function to which the CDRs need to be sent. The P-CSCF may insert this into the header of every request/response that does include this header.

Additional SIP enhancements for IMS include the P-Charging-Vector, P-Preferred-Identity and Security-Verify. The P-Charging-Vector provides a unified identifier for correlating charging records from disparate network entities, while the P-Preferred-Identity provides the identity that the user wants to use for the session. Security-Verify is described in the Security Mechanism Agreement for the Session Initiation Protocol (SIP), January 2003 (RFC 3329), the entire disclosure of which is herein expressly incorporated by reference.

With respect to the PII SIP enhancement, P-Asserted-Identity is used to create a trust domain amongst the servers. It should be noted that in IMS, this enhancement is used to indicate the preference for a particular user identity. The guide enhancement is used to uniquely identify the client and to perform fast lookup of the persistent TLS session within the edge element. Finally, with respect to the a=direction attribute, the user client always inserts the direction attribute in the SDP to indicate that it shall be the initiator. This is required to indicate that the system becomes aware that the client will be sending out the RTP primer packet to assist in NAT traversal for the media path.

It should further be noted that in order to inter-work with iDEN, two types of contents are specified for PII Multipurpose Internet Mail Extensions (MIME) Part One: Format of Internet Message Bodies, November 1996 (RFC 2045), and Multipurpose Internet Mail Extensions (MIME) Part Two: Media Types, November 1996 (RFC 2046), the entire disclosures of which are herein expressly incorporated by reference. Moreover, PII places constraints on the SIP implementation as defined in SIP: Session Initiation Protocol, June 2002 (RFC 3261), the entire disclosure of which is also herein expressly incorporated by reference.

With respect to media, both PII and IMS use RTP/UDP as the transport for the media traffic. However, as noted previously, media server may be present in the media path for each session in PII, irrespective of the type of session (private or group). The media server in PII may serve the dual purpose of performing jitter management on the media stream, and assisting the user device in traversing the NAT devices present along the path. It should be noted that the media server may set up a bi-directional path between the users. Therefore, if the floor control is via SIP INFO, the media server is not required if NATs are not expected in the path. The jitter buffering can be accomplished at the edge routers (PDSNs, Radio Routers etc.).

With respect to IMS, NAT traversal by devices has not been considered. As such, to enable traversal of NATs between the device in and the system in IMS, a session border controller is needed that performs the same basic functionality that the media server supports in PII.

With respect to the way mobility is handled by IMS and PII respectively, IMS relies on the GPRS/Mobile IP driven macro-mobility solution to ensure that the session controller is able to route the incoming sessions for the users to the appropriate edge routers (GGSN/PDSN). Thus, IMS relies on the underlying access network to ensure micro-mobility as users move from one cell to another. On the other hand, mobility is not readily provided for in PII since it was originally architected for wireline access. However, if desired, PII can include mobility.

Referring now to how QoS is handled by IMS and PII, IMS was developed for heterogeneous media traffic with different quality of service requirements. A policy definition function has been defined that provides per-session policy to be enforced at the edge routers. COPS is envisioned to be the interface between PDP and PEP.

In contrast, PII was originally initially architected for homogeneous voice traffic, and therefore no elaborate QoS mechanisms have been developed within the architectural framework of PII. However, if desired, elaborate QoS mechanisms can be provided.

Converging IMS and PII

Figure 18:
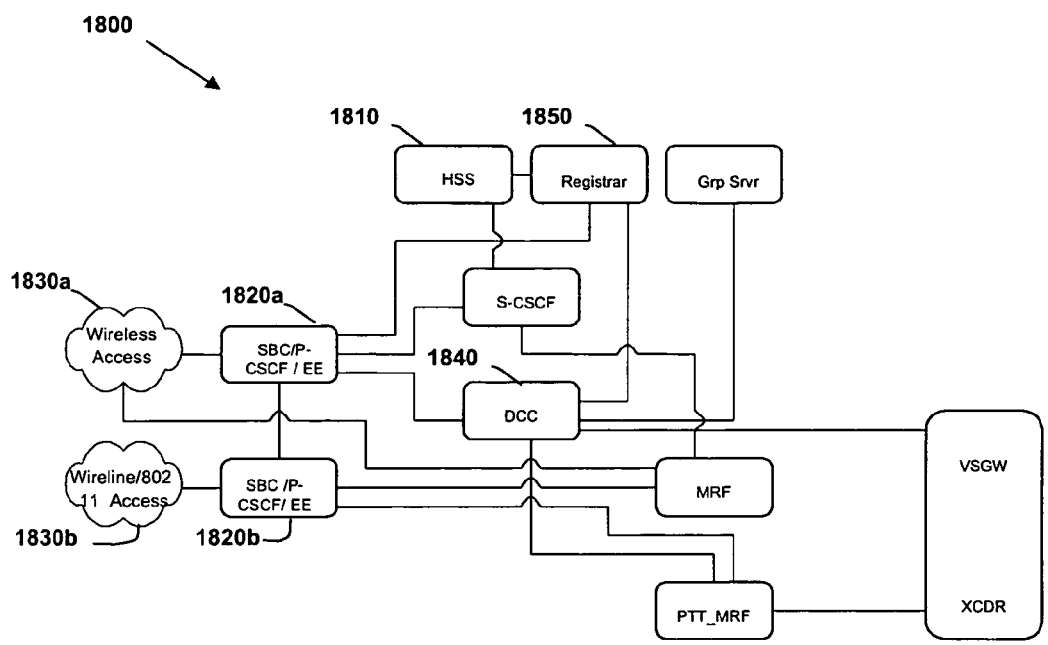
FIG. 18 illustrates an architecture for converging PII with IMS in accordance with a first embodiment of the invention.

As previously mentioned, one aspect of the invention is to provide a way of converging IMS and PII. In one embodiment, convergence between IMS and PII is achieved by having a common HSS and P-CSCF/EE (also referred to as having a common database), while maintaining separate registrar elements, session control elements and media elements. To that end, FIG. 18 depicts the network architecture 1800 in accordance with one embodiment of the invention in which a common database function, HSS 1810, is used for both PII and IMS. Moreover, elements 1820*a* and 1820*b* are used as the common edge proxy for both IMS and PII. In one embodiment, the P-CSCF profiles may be different for wireless clients 1830*a* and wireline clients 1830*b*. Wireline clients 1830*b* may require NAT traversal algorithms/methods in the EE to enable end-to-end session across NAT devices. Therefore, to address wireline clients, a combination of SBC/EE is used at the edge (i.e., in elements 1820*a* and 1820*b*) to maintain persistent connections for routing incoming calls to the wireline end-subscribers. However, it is possible to have a unified P-CSCF that works across both wireline/wireless access networks.

In order to provide the aforementioned converge, certain IMS modifications may be required. For example, P-CSCF may need to support routing based on call type. Additionally, the client-server protocol may need to be modified to support header fields or MIME message body to indicate the type of call being originated by the subscriber. Moreover, the P-CSCF should support NAT traversal using symmetric RTP method using RTP primer packet for low latency call setup and persistent connections, possibly by working in conjunction with SBC to facilitate security and NAT traversal.

With respect to PII modifications, DCC 1840 should be modified to support IMS SIP enhancements for interfacing with the P-CSCF (of elements 1820*a* and 1820*b*). The Registrar 1850 may be responsible for interfacing with the HSS 1810 to authenticate and authorize subscribers. Additionally, the Registrar 1850 may be modified to provide to the HSS 1810 the address of the P-CSCF to which the client is attached. The client may also be modified to support IMS-compliant SIP signaling.

Additionally, instead of DCC 1840 querying the location to complete the session, the DCC 1840 may query the location via the HSS 1810. In this case, the DCC 1840 may be modified to support Cx interface to support locating the called user.

Figure 19:
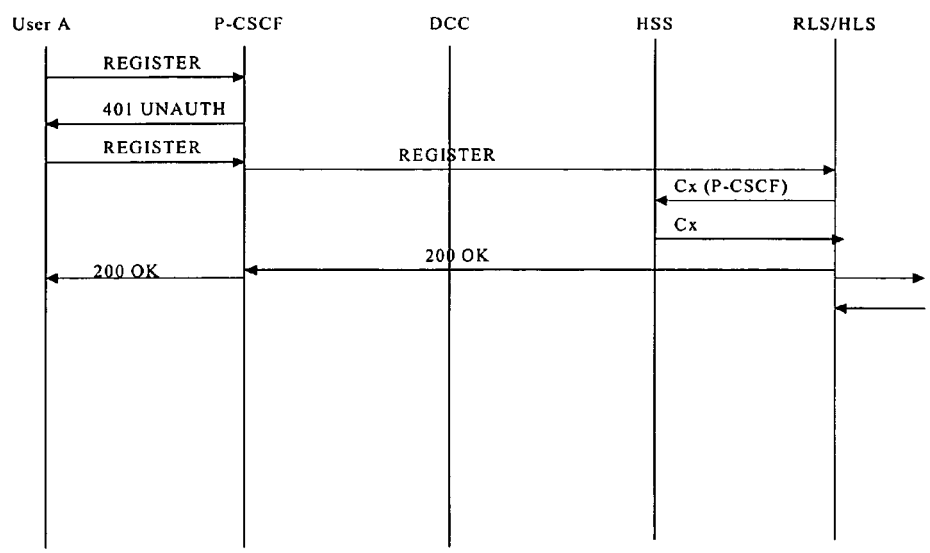
FIG. 19 illustrates an exemplary call flow for the converged architecture of FIG. 18 for home PII registration.
Figure 20:
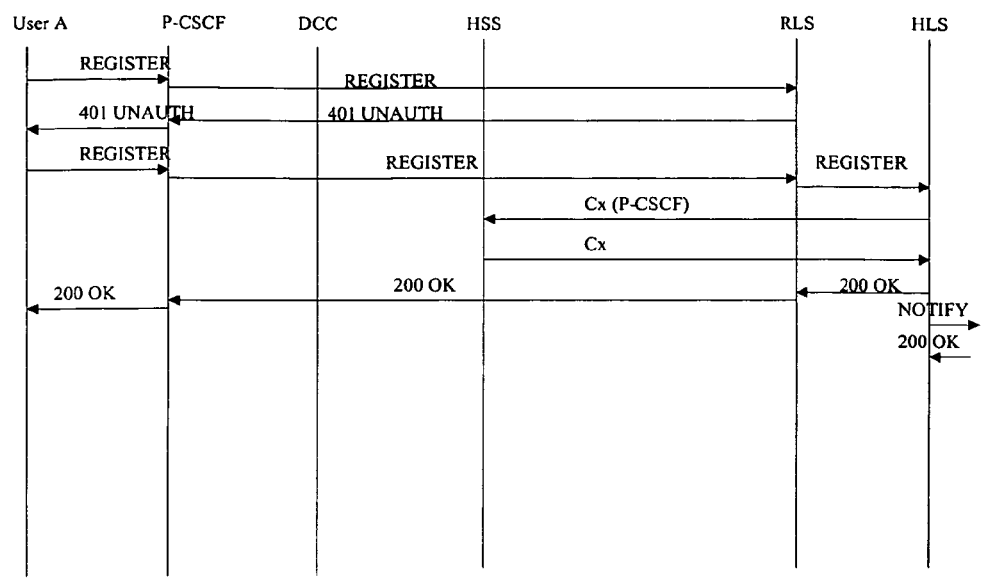
FIG. 20 illustrates an exemplary call flow for the converged architecture of FIG. 18 for visitor PII registration.
Figure 21:
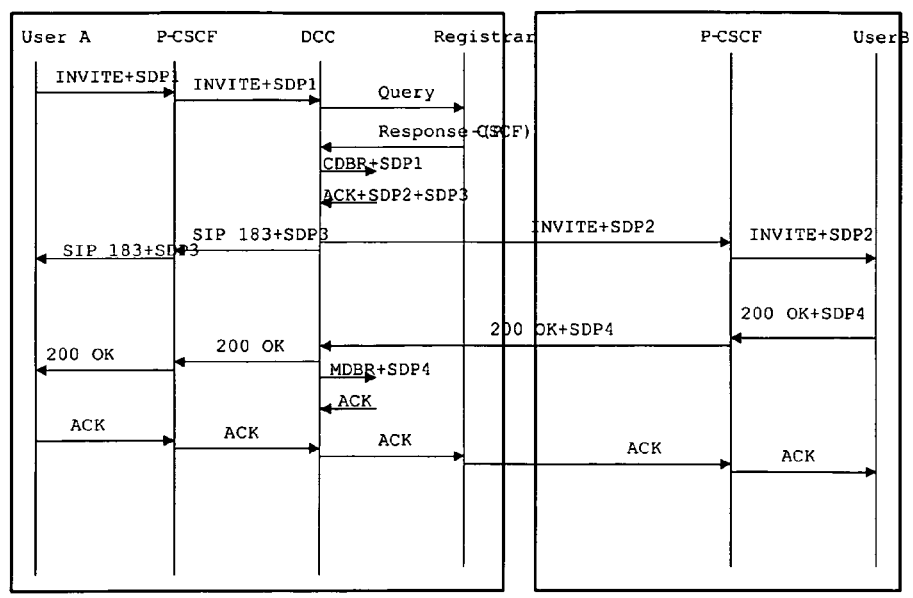
FIG. 21 illustrates an exemplary call flow for PTT session setup in the converged architecture of FIG. 18, wherein both the calling party and called party are in their home areas.
Figure 22:
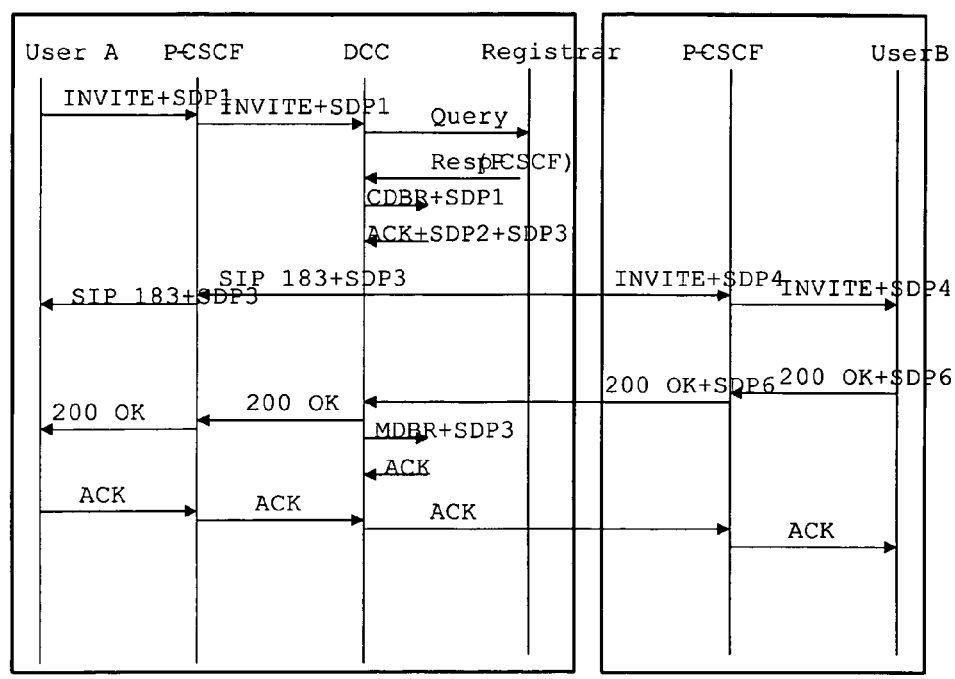
FIG. 22 illustrates an exemplary call flow for PTT session setup in the converged architecture of FIG. 18, wherein both the calling party and the called party are in visited areas.

FIGS. 19-20 depict the registration call flows for the convergence architecture 1800 of FIG. 18, while FIGS. 21-22 depict the PTT call setup under the same architecture. In one embodiment, the basic flow of messages remains unchanged.

In accordance with a second embodiment of the invention, in addition to using a common database, the IMS registrar may be leveraged by the PII network for subscriber registration. To that end, FIG. 23 illustrates an exemplary network architecture 2300 in accordance with this second embodiment for converging PII and IMS.

As with the embodiment of FIG. 18, the network architecture 2300 of FIG. 23 uses a common database function, HSS 1810 for both PII and IMS. Moreover, elements 1820*a* and 1820*b* are used as the common edge proxy for both IMS and PII, as discussed in detail above with reference to the architecture of FIG. 18. Similar PII modifications as those described above with reference to the architecture of FIG. 18 may be made to the DCC 1840.

In addition, however, the functionality of Registrar 1850 and the S-CSCF may be combined into S-CSCF/Registrar 2310, as shown in FIG. 23. In one embodiment, the S-CSCF differentiates between IMS and PTT registration, while in another embodiment a single registration may be used to register the subscriber for all services. S-CSCF may need to provide the address of the P-CSCF to the HSS 1810 for the point of attachment for the PTT registration. In one embodiment, this minimizes the impact on the DCC 1840.

Continuing to refer to FIG. 23, the DCC 1840 may need to interface with S-CSCF to query the location of the called subscriber to complete the call. Alternatively, the DCC 1840 may directly query the location from the HSS 1810 via a Cx interface.

FIGS. 24 & 25 depict one embodiment of the registration call flow for the architecture 2300 of FIG. 23. Similarly, FIG. 26 is a call flow for architecture 2300 in which the querying of the terminating P-CSCF is done by the DCC 2340.

In accordance with a third embodiment of the invention, in addition to using a common database, and having the IMS registrar be leveraged by the PII network, it is further possible to have the IMS and PTT networks share the same media servers. To that end, FIG. 27 illustrates an exemplary network architecture 2700 in accordance with this third embodiment for converging PII and IMS. As shown, the media server (MRF) 2710 is also being shared in architecture 2700.

In order to implement the architecture 2700 of FIG. 27, it may be necessary to modify the MRF of the IMS network to support jitter buffering and NAT traversal. In one embodiment, MRF 2710 is capable of serving requests from multiple controllers, and of bridging the two media legs of the dispatch session.

DCC 1840 may support MEGACO signaling protocol to interface with the MRF 2710. It should be noted that the registration call flows for the architecture 2700 may be the same as those shown in FIGS. 24 & 25, as described above with reference to architecture 2300.

In addition, the call setup flows for the architecture 2700 of FIG. 27 may be the same as those previously discussed with reference to FIGS. 21 & 22, except for the interaction with the media server MRF 2700. Namely, the interaction between DCC 1840 and MRF 2710 may be via MEGACO protocol instead of the MFCP protocol. One embodiment of the call setup flow for architecture 2700 is depicted in FIG. 28.

In accordance with a fourth embodiment of the invention, in addition to using a common database, having the IMS registrar be leveraged by the PII network, and having a common media server, it is further possible to have further convergence between PII and IMS by having a common session controller for both PII and IMS. To that end, FIG. 29 illustrates an exemplary network architecture 2900 in accordance with this fourth embodiment for converging PII and IMS.

As shown, a common PTT gateway (PTG) 2910 is used in architecture 2900. In some embodiments, the PTG 2910 may interface with particular networks and/or may facilitate interoperability with other dispatch technologies, such as PII. In one embodiment, PTG 2910 may provide IMS specific SIP signaling to PII specific SIP signaling for iDEN interoperability, and/or IMS specific talker arbitration to PII specific talker arbitration. If cut-through architecture is desired to improve the performance of PTT dispatch sessions, additional architectural changes may be required within IMS.

In order to implement the architecture 2900 of FIG. 29, it may be necessary for the IMS network to support talker arbitration. The talker arbitration may be either via the control plane (S-CSCF/Registrar 2310) or via the bearer plane (MRF 2710). In one embodiment, the S-CSCF/Registrar 2310 supports call states for both VoIP and dispatch sessions.

One potential drawback from the perspective of the PII network is that the architecture 2900 may not achieve optimal performance since IMS supports only pass-through for visiting subscribers.

Referring now to FIGS. 30 & 31 depict the inter-regional PTT session setup for the architecture 2900 of FIG. 29. Namely, FIG. 30 depicts the inter-regional scenario where the calling party and called party are located in different regions, while FIG. 31 depicts the inter-regional scenario where the calling party and called party are roaming in different regions.

Referring now to FIG. 32, depicted is one embodiment of SIP-to-iDEN PTT session involving the PTG 2910. The PTG 2910 may perform the necessary signaling translation between the IMS/PII domain and the iDEN domain in accordance with one embodiment of the invention.

As discussed above, the invention envisions four options of increasing convergence of IMS and PII. The first three options integrate many of the functions of PII into IMS, while still maintaining the differentiating session performance of PTT sessions. However, the fourth option converges the session control of PII and IMS.

The following documents provide additional information which may be relevant to the present disclosure. As such, they are each expressly incorporated herein by reference:

1. ETSI TS 123 221 V5.8.0;
2. ETSI TS 124 228 V5.7.0 (2003-12): Signaling Flows for the IP multimedia call control based on SIP and SDP; Stage 3 (3GPP TS 24.228 version 5.7.0 Release 5); and
3. GPP TS 29.228 V6.3.0 (2004-06) IP Multimedia Subsystem Cx and Dx interfaces; Signaling flows and message contents (Release 6).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A network architecture for converging a Push-To-Talk Interoperability Infrastructure (PII) network architecture and an IP Multimedia Subsystem (IMS) network architecture, comprising:
a Push-To-Talk Interoperability Infrastructure (PII) network architecture including:
a PII registrar element;
a PII session control element coupled to the PII registrar element; and
a PII media element coupled to the PII session control element;
an IP Multimedia Subsystem (IMS) network architecture including:
an IMS registrar element;
an IMS session control element coupled to the IMS registrar element; and
an IMS media element coupled to the IMS session control element;
wherein the PII network architecture registrar element, session control element, and media element are not coupled to the IMS network architecture registrar element, session control element, and media element;
a home subscriber server (HSS) containing a database of subscriber data for subscribers of the PII network architecture and the IMS network architecture coupled to the PII network architecture and the IMS network architecture, wherein the database of subscriber data is shared by the PII network architecture and the IMS network architecture; and
an edge proxy coupled to the PII network architecture and the IMS network architecture and used by both the PII network architecture and the IMS network architecture.

2. The network architecture of claim 1, wherein the edge proxy is a proxy call session control function (P-CSCF).

3. The network architecture of claim 2, wherein the P-CSCF is configured to support routing based on a call type.

4. The network architecture of claim 2, wherein the edge proxy further comprises a combined Session Border Control (SBC) and Edge Element (EE) for routing calls to wireline subscribers.

5. The network architecture of claim 4, wherein the P-CSCF is configured to support network address translation (NAT) traversal using symmetric real-time transport protocol (RTP) method.

6. The network architecture of claim 1, wherein a client-server protocol for the IMS network architecture is configured to indicate a type of call being originated by a subscriber using one or more of header fields and MIME message body.

7. The network architecture of claim 1, wherein the PII network architecture further includes a dispatch call controller that is configured to support IMS Session Initiation Protocol (SIP) enhancements for interfacing with the edge proxy.

8. The network architecture of claim 1, wherein the PII registrar element is configured to interface with the HSS to authenticate and authorize subscribers.

9. The network architecture of claim 1, wherein the PII registrar element is configured to provide the HSS with an address of the edge proxy.

10. The network architecture of claim 1, wherein the PII network architecture further includes a dispatch call controller that is configured to query the HSS for location information.

* * * * *